UNITED STATES PATENT OFFICE 1,989,093

AMINO ALCOHOLS AND THE PRODUCTION THEREOF

Walter Henry Hartung, Baltimore, Md., assignor to Sharp & Dohme, Incorporated, Philadelphia, Pa., a corporation of Maryland No Drawing. Application May 2, 1929, Serial No. 359,999

12 Claims. (Cl. 260—128.5)

This invention relates to a process for synthesizing primary amines and to certain novel products resulting therefrom. More particularly the invention relates to a novel process for the production of primary amines by catalytic reduction of oximes and nitriles and to novel chemical compounds produced by the process.

It has heretofore been known that oximes and nitriles can be reduced by hydrogen in the presence of suitable catalysts; and a large amount of research has been devoted to the study of this reduction. In the reduction as carried out prior to my invention, however, the primary amines have been obtained only in relatively low yields and contaminated by mixtures of secondary amines and ammonia.

More recently primary amines have been obtained in higher yields by starting with the acetate of an oxime or by carrying out the reduction in acetic anhydride so as to form the acetyl derivative of the primary amine. These processes, however, require subsequent treatment in order to obtain the pure amine.

I have now discovered that it is possible to obtain the primary amines in almost full theoretical yield by carrying out the reducing reaction in a suitable solvent in the presence of a catalyst and a relatively large amount of a strong acid. In this manner the oxime or the nitrile may be reduced to the corresponding primary amine, which combines with the acid present to form the amine salt.

If a ketone group is also present, it may be simultaneously reduced to a secondary alcoholic group or in some cases it may be completely reduced so that the oxygen is eliminated.

The resulting salt of the primary amine may be precipitated from the solution and by treatment with caustic alkali may be converted into substantially pure primary amine.

The catalyst which I have found to be most efficient in the new process is palladium supported on charcoal. This catalyst may be prepared, for example, by agitating a powdered charcoal, such as pure animal charcoal, with an aqueous solution of palladium chloride in an atmosphere of hydrogen. A suitable proportion is about one part of palladium chloride to six parts of charcoal. Agitation should be continued until the palladium chloride is reduced and the palladium deposited on the charcoal. The catalyst may then be filtered off, washed and dried and is ready for immediate use in my process; or it may be kept in vacuo over sulfuric acid until used.

The acid which I have found most satisfactory is dry hydrogen chloride; and the solvent in general will be absolute alcohol.

The following examples are illustrative of the manner in which my invention may be practiced:

*Example 1.*—3 parts of benzaldoxime is dissolved in about 40 parts of absolute alcohol, together with 2.7 parts of hydrogen chloride. The catalyst prepared as described above is added to this solution and hydrogen is passed into the solution with vigorous agitation. After about 1½ hours the reduction is complete and the catalyst may be removed by filtration. The filtrate is evaporated or otherwise concentrated, after which an excess of ether is added. Benzylamine hydrochloride precipitates in almost quantitative yield. The product shows a melting point of 258° C.

The use of acid in substantially the amount specified is of great importance. A less amount of acid will result in an impure product. When, for example, one equivalent of hydrogen chloride is used instead of three equivalents, as above, an impure product is obtained which melts at 220–230° C. The primary amine predominates in this product, but is contaminated by a relatively large amount of the secondary amine.

H—C=N—OH      CH₂—NH₂·HCl 

Benzaldoxime     Benzylamine hydrochloride

*Example 2.*—2.6 parts of benzonitrile are dissolved in about 40 parts of absolute alcohol containing 0.9 parts of hydrogen chloride. The reduction is accomplished as in Example 1. In this case, as in Example 1, the product of the reaction is substantially pure benzyl amine hydrochloride.

CN 

Benzonitrile

*Example 3.*—9.8 parts of iso nitroso propiophenone are dissolved in about 150 parts of absolute alcohol, containing 7 parts of hydrogen chloride.

The procedure is similar to that of Example 1, reduction being complete in about 2½ to 3 hours. The catalyst is then filtered off and the alcohol solution concentrated to about one-sixth of its original volume, after which ether is added in amount sufficient to precipitate the phenyl propanol amine hydrochloride. The latter is obtained in almost theoretical yield having a melting point of 191° C. after crystallization from alcohol.

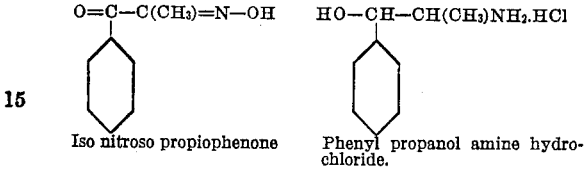

Iso nitroso propiophenone    Phenyl propanol amine hydrochloride.

*Example 4.*—8.8 parts of para-methyl iso-nitroso propionphenone (p-tolyl-α-oximino ethyl ketone) are dissolved in 120 parts of absolute alcohol containing 6.7 parts of hydrogen chloride and a catalyst added as in Example 1. The mixture is treated and the product isolated as described in Example 1. The precipitate, after crystallization from alcohol is substantially pure p-tolyl-1-amino-2-propanol-1 hydrochloride which melts at 205° C.

The compound para-methyl-iso-nitroso-propiophenone which is used as the initial product in the above example is, so far as I am aware, a new compound which may be prepared in the following manner:

Hydrogen chloride is slowly bubbled through a solution of 88.8 parts of p-tolyl-ethyl ketone in 400 parts of ether, meanwhile agitating the solution. 61.8 parts of distilled butyl nitrite are also added very slowly, e. g. during the course of about 90 minutes. When the mixture is complete, it is allowed to stand for some time, advantageously over night and is then extracted rapidly with dilute alkali solution until no further product is obtained. The alkaline extract is then slowly added to cold strong acid while agitating the mixture. The solid which separates is recrystallized from a suitable solvent, for example, toluene. The product is pure p-tolyl-alpha-oximino ketone which melts at 125° C.

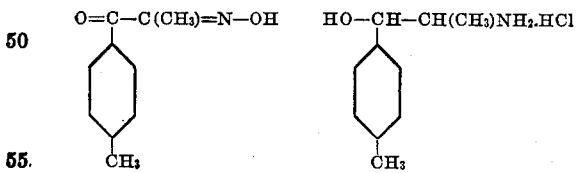

Para methyl iso nitroso propiophenone    Para tolyl-1-amino-2-propanol-1 hydrochloride.

*Example 5.*—8.8 parts of iso-nitroso butyrophenone is dissolved in 115 parts of absolute alcohol, containing 6.0 parts of hydrogen chloride. The same catalyst is added and the reduction accomplished as described in Example 1. The product recovered from this reaction is the hydrochloride salt of phenyl-1-amino-2-butanol-1 having a melting point of 242° C.

Substantially pure iso-nitrose-butyrophenone has not, so far as I am aware, been prepared heretofore, nor described in literature. I have found, however, that it may be prepared in substantially pure form. In the same manner as that described above for the preparation of p-methyl-iso-nitroso-propiophenone, using instead of p-tolyl ethyl ketone 88.8 parts of butyrophenone. The iso-nitroso-butyro-phenone, which in this case I prefer to recrystallize from ligroin and then from dilute alcohol, melts at 56 to 58° C.

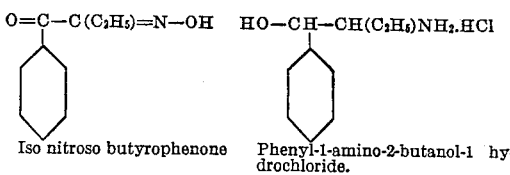

Iso nitroso butyrophenone    Phenyl-1-amino-2-butanol-1 hydrochloride.

The proportions above specified may be varied in some instances without departing from the invention in its broader aspect. Thus the amount of acid may be somewhat increased, but it is essential that a sufficient amount of acid be used if the production of secondary amines and ammonia is to be avoided. If substantially less amounts of acid are used than those specified above, secondary amines will be found in the product; while, if the acid is omitted altogether, or used only in very small amounts, the product will be similar to that contained in the prior art and will contain relatively large proportions of secondary amines and ammonia and a relatively low yield of primary amines. When, for example, iso-nitroso propiophenone is reduced in the absence of hydrogen chloride, the reduction proceeds very slowly and to incompletion. For example, with 3.3 parts of iso-nitroso ketone, after six hours and after absorbing only a little less than the amount of hydrogen theoretically required for the reduction to primary amines, only 1.3 parts of an unidentified material could be isolated which melted at 108 to 110° C. and when mixed with known phenyl-propanol-amine showed a melting range from 70 to 80° C.

In general 1 molecular equivalent of hydrogen chloride suffices for the reduction of each molecular equivalent of nitrile and 3 molecular equivalents of hydrogen chloride should be used for each molecular equivalent of oxime. It is frequently desirable to use more than this minimum amount.

The amount of catalyst which is used in the reducing reactions may vary somewhat according to the conditions of the reaction. In general, I have found it advantageous to use the catalyst produced from one-half part of palladium chloride for the reduction of about 10 parts of oximino ketone.

I find it advantageous to use as the solvent in the reduction process absolute alcohol, and I have therefore described its use in connection with the above specific examples. I do not wish to limit myself, however, to this particular solvent. Thus it is not necessary that absolute alcohol should be used; the reduction may be accomplished with ordinary alcohol or with alcohol which is even more dilute than the ordinary commercial product. The results are less satisfactory, however, when water is present than when using as a solvent an alcohol which is free from water.

By the reduction of oximes and nitriles in accordance with the invention as described above, the pure primary amines are obtained as hydrochlorides. The free base may be obtained by treatment with a fixed alkali in a known manner. For example, the p-tolyl-1-amino-2-propanol-1 hydrochloride, when treated with an aqueous solution of sodium or potassium hydroxide, liberates the free base p-tolyl-propanol-amine, which after purification by crystallizing from a suitable solvent, melts at 112° C.

Similarly, the hydrochloride salt of phenyl-1-amino-2-butanol-1 may be treated with aqueous alkali solution so as to obtain a free base having a melting point of 80.5 to 81.0° C.

The product, p-tolyl-1-amino-2-propanol-1 hydrochloride and its base, prepared in the manner described above, are new compounds which I have discovered and prepared for the first time, in the course of these researches.

The primary aromatic amino alcohols prepared in the above manner and particularly the new product p-tolyl-propanol-amine, are particularly useful as blood pressors. The hydrochloride salts of the phenyl and p-tolyl-propanol-amines when administered to animals either by intravenous injection or orally produced results which compare favorably with those from ephedrine.

The phenyl and p-tolyl-propanol-amine hydrochlorides are also useful as mydriatics and exhibit in animals effects which compare favorably with those of ephedrine.

It will readily be appreciated by those familiar with this art that this invention achieves what research chemists are continually striving toward, but rarely attain—a reaction so controlled as to be practically unaccompanied by side reactions and to produce a principal product substantially in theoretical yield and free from any considerable contamination. And thus I have provided a novel and highly satisfactory method for producing pure primary amines directly, by controlling a catalytic reaction which had heretofore been known only as one accompanied by objectionable side reactions, causing contamination of the product with impurities and reduced yield of the primary amines.

My invention is of particular value in the synthesis of primary amino alcohols for therapeutic use and by this invention I have made available for therapeutic use a new group of compounds. Within this group I have discovered certain new and useful compounds not heretofore known to exist, the new compound, p-tolyl-propanol-amine being particularly valuable therapeutically as indicated above.

In the appended claims I have used the terms "oximes" and "nitriles" as including not only the oximes and nitriles per se, but also derivatives, such as the oximino ketones, which contain the C=NOH and the C≡N, characteristic groups of the oximes and nitriles respectively. The term "isonitroso" refers to compounds containing the group —C:O.C(:N.OH)—. "Isonitroso" and "oximino" are used interchangeably in the application.

Where I have referred to "amines" in the accompanying claims I intend that the hydrochloride salt shall be included as well as the free base, except where otherwise specifically stated.

I claim:

1. The method of producing primary amines by catalytic reduction of oximes and nitriles, which comprises performing such reduction in the presence of a strong acid in amount sufficient to substantially prevent the formation of secondary amines and ammonia.

2. The method of producing primary amines by catalytic reduction of oximes and nitriles, which comprises performing such reduction in the presence of hydrogen chloride in amount sufficient to substantially prevent the formation of secondary amines and ammonia.

3. The method of producing primary amines from a compound of the class consisting of oximes and nitriles which comprises subjecting such compound to the action of hydrogen in the presence of a metallic hydrogenation catalyst and hydrogen chloride.

4. The method of producing primary amines from a compound of the class consisting of oximes and nitriles, which comprises reducing such compound by mixing hydrogen into a solution of such compound and hydrogen chloride in absolute alcohol in the presence of a metallic hydrogenation catalyst.

5. The method according to claim 4 in which the hydrogen chloride is present in amount not less than the molecular equivalent of the compound which is being reduced.

6. The method of producing primary amines from oximes, which comprises reducing an oxime by agitating a solution thereof in absolute alcohol containing hydrogen chloride and a metallic hydrogenation catalyst in an atmosphere of hydrogen, the amount of hydrogen chloride in the solution being not less than three times the molecular equivalent of the oxime.

7. The method of reducing oximino ketones for the production of corresponding amino alcohols which comprises dissolving an oximino ketone and hydrogen chloride in absolute alcohol in the proportion of at least three molecular equivalents of the latter to one of the former, adding to the solution a metallic hydrogenation catalyst, agitating the solution in an atmosphere of hydrogen until reduction is complete, thereafter recovering the amino alcohol from the solution.

8. The method of producing p-tolyl-1-amino-2-propanol-1 from p-tolyl-iso-nitroso-propiophenone which comprises dissolving in absolute alcohol p-tolyl-iso-nitroso-propiophenone and hydrogen chloride, in proportion of about three molecular equivalents of the latter to one of the former, adding to the solution a palladium catalyst and agitating the solution in an atmosphere of hydrogen until reduction is complete, separating the catalyst from the resulting solution, concentrating the solution and precipitating p-tolyl-1-amino-2-propanol-1 hydrochloride by adding ether to the concentrated solution.

9. The method according to claim 8, in which the p-tolyl-1-amino-2-propanol-1 hydrochloride is treated with a fixed alkali in amount sufficient to convert the hydrochloride into the free base.

10. P-tolyl-1-amino-2-propanol-1.

11. P-tolyl-1-amino-2-propanol-1 hydrochloride.

12. Compounds of the following formula

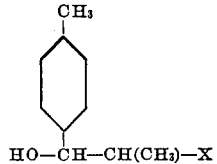

where X may be an $NH_2$ group or an $NH_2.HCl$ group.

WALTER HENRY HARTUNG.